(12) United States Patent
Papadopoulos et al.

(10) Patent No.: US 6,776,382 B1
(45) Date of Patent: Aug. 17, 2004

(54) EXPANDABLE GLASS HOLDER FOR CLEANING OR CUTTING GLASS

(75) Inventors: Athanasious Papadopoulos, 1676 N. Main St., Williamstown, NJ (US) 08094; Mark R. Slazak, Williamstown, NJ (US)

(73) Assignee: Athanasious Papadopoulos, Williamstown, NJ (US)

( * ) Notice: Subject to any disclaimer, the term of this patent is extended or adjusted under 35 U.S.C. 154(b) by 0 days.

(21) Appl. No.: 10/230,955

(22) Filed: Aug. 29, 2002

Related U.S. Application Data (63) Continuation of application No. 09/710,559, filed on Nov. 8, 2000, now abandoned.

(51) Int. Cl.[7] .......................... A47G 29/00; B65D 19/38
(52) U.S. Cl. ............................... 248/346.07; 108/54.1; D7/388
(58) Field of Search ................. 248/346.07, 163.1, 248/166, 346.3, 152, 150, 167; 211/85, 105; D7/388, 130; 108/54.1

(56) References Cited

U.S. PATENT DOCUMENTS

| | | | | |
|---|---|---|---|---|
| 132,692 A | * | 10/1872 | Roddy | 211/105 |
| 1,952,494 A | * | 3/1934 | Gafford | 248/167 |
| 1,994,897 A | * | 3/1935 | Owen | 211/105 |
| 2,739,776 A | * | 3/1956 | Terando | 108/54.1 |
| 3,225,938 A | * | 12/1965 | Von Bromssen | 211/85 |
| 3,695,187 A | * | 10/1972 | Weiss | 108/54.1 |
| 3,967,803 A | * | 7/1976 | Kienlen et al. | 248/152 |
| 3,977,333 A | * | 8/1976 | Phillips | 108/54.1 |
| 4,104,952 A | * | 8/1978 | Brass | 411/500 |
| 4,497,413 A | * | 2/1985 | Tocci | 211/202 |
| 4,725,028 A | * | 2/1988 | Conradt | 248/150 |
| 5,181,686 A | * | 1/1993 | Barthel | 248/346.07 |
| 5,394,306 A | * | 2/1995 | Koenck et al. | 361/809 |
| 6,000,666 A | * | 12/1999 | Kari | 248/150 |

* cited by examiner

*Primary Examiner*—Anita M. King
(74) *Attorney, Agent, or Firm*—Norman E. Lehrer (57) ABSTRACT

An expandable holder for elevating and holding glass while the glass is being cleaned or cut is disclosed. The expandable holder includes a first member and a second member. Each of the first and second members has a first side which includes a plurality of bumpers attached thereto. The glass is placed on the plurality of bumpers and is retained thereon without the glass being scratched. The first and second members may be rotatably connected together. The first and second members are connected together so that the first side of the first member and first side of the second member lie in the same plane. The spacing between the first and second members may be adjusted. Each of the first and second members also has a second side where this side has a plurality of legs attached thereto.

17 Claims, 10 Drawing Sheets

EXPANDABLE GLASS HOLDER FOR CLEANING OR CUTTING GLASS

CROSS-REFERENCE TO RELATED APPLICATIONS

This application is a Continuation of co-pending U.S. patent application Ser. No. 09/710,559 filed on Nov. 8, 2000 now abandoned.

FIELD OF THE INVENTION

This invention relates to improved methods and apparatus for cleaning or cutting glass or other plate like material.

BACKGROUND OF THE INVENTION

Currently, glass is typically cleaned or cut by placing the glass on a flat surface. This is disadvantageous in that it is difficult to pick up the glass. In addition, an individual may cut his or her fingers while trying to pick up the glass.

SUMMARY OF THE INVENTION

The present invention in one or more embodiments provides a portable device for elevating glass and holding glass or some other plate like material, while the plate like material is being cleaned or cut. The device should have the ability to be folded or slid together so that it can be easily stored or expanded outwards for usage.

The present invention in one or more embodiments provides a method comprised of expanding an expandable apparatus and placing a sheet of glass or some other plate like material on the expandable apparatus. The sheet of glass can then be cleaned or cut.

The expandable apparatus may be comprised of a first and a second member. The first member and the second member may be each comprised of a plurality of bumpers or one or more strips of material, wherein the glass is placed and lies on the plurality of bumpers or the one or more strips of material. The first member and the second member may be rotatably connected together. The bumpers or the strips of material may be rubber and may retain the glass in place through friction.

The first member may have a first side to which a plurality of bumpers are attached. The second member may have a first side to which a plurality of bumpers are attached. The first and second members may be connected together so that the first side of the first member and the first side of the second member lie in the same plane. The first and second members may be connected together so that the spacing between the first and second members can be adjusted.

The first member and the second member may each have first and second ends. The first end of the first member and the first end of the second member may be rotatably connected together. The first member may include a second side, which has a plurality of legs attached to it, and the second member may include a second side, which has a plurality of legs attached to it.

The expandable apparatus may be further comprised of a third member and a fourth member. The first end of the first member may be rotatably connected to the first end of the second member. The second end of the first member may be rotatably connected to the first end of the third member, and the second end of the third member may be rotatably connected to the first end of the fourth member. A point substantially at the center of the second member may be rotatably connected to a point substantially at the center of the fourth member. The connections may permit the expandable apparatus to expand and contract. A plurality of further members may supplement the first, second, third, and fourth members or may lie in between any two of the first, second, third, and fourth members.

The first member and the third member may be about equal in size. The second member and the fourth member may be about equal in size. The first member may be about half the size of the second member. The first member and the third member may each be comprised of a first portion and a second portion having different thicknesses. The second member and the fourth member may each have substantially uniform thickness.

The third member may be rotatably connected at its second end to the fourth member and the fourth member may be rotatably connected at a point substantially at its center to the third member at a point substantially at its center, so that the third member and the second member lie on top of the fourth member. The first portions of the first and third member may have first ends which are curved and second ends which are straight edges. The first portions may have a width which gradually increases from the first end to the second end.

In one embodiment of the present invention an apparatus comprising a first rail and a second rail is disclosed. A first member and a second member are provided which are connected to the first rail at their first ends and to the second rail at their second ends. The first ends of the members, in this embodiment, can be slid along the first rail and the second ends of the members, in this embodiment, can be slid along the second rail, in order to adjust the spacing between the first and the second members.

DETAILED DESCRIPTION OF THE DRAWINGS

Figure 1:
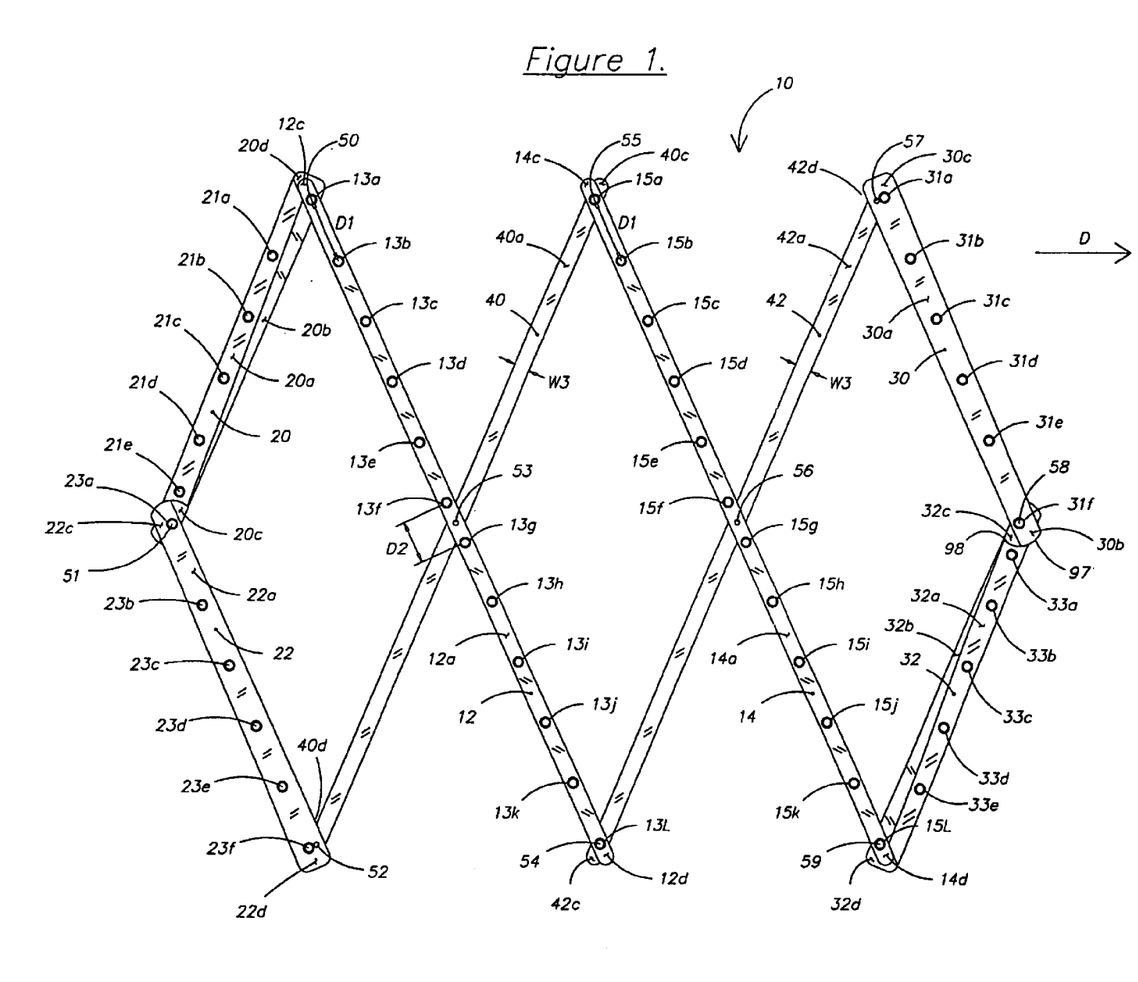
FIG. 1 shows a top planar view of an apparatus for use in accordance with a first embodiment of the present invention with the apparatus in a fully expanded state.

FIG. 1 shows a top planar view of an apparatus 10 for use in accordance with a first embodiment of the present invention with the apparatus 10 in a fully expanded state. The apparatus 10 includes members 12, 14, 20, 22, 30, 32, 40 and 42.

As shown in FIG. 1 member 12 has bumpers 13a, 13b, 13c, 13d, 13e, 13f, 13g, 13h, 13I, 13j, 13k, and 13L attached to it, for a total of twelve bumpers. The bumpers 13a–L are arranged in a nearly uniform manner. The distance between bumpers 13a and 13b, for example, is D1 which may be three inches. The distance between the other bumpers of 13a–L may be the same except that the distance between bumpers 13f and 13g is D2 which may be two inches. Member 14 may be identical to member 12. Member 14 may have twelve bumpers 15a–15L which are also spread out in a similar manner to member 12.

Members 40 and 42 do not include any bumpers in the embodiment shown in FIG. 1. This is because members 40 and 42 do not typically come into contact with a piece of glass that may be placed on the apparatus 10. Member 20 includes five bumpers 21a, 21b, 21c, 21d, and 21e. Member 22 includes six bumpers 23a, 23b, 23c, 23d, 23e, and 23f. Member 30 includes six bumpers 31a, 31b, 31c, 31d, 31e, and 31f. Member 32 includes five bumpers 33a, 33b, 33c, 33d, and 33e. The distance between adjacent bumpers on a member is D1 except for the distance D2 between bumpers 23a and 23b, 13f and 13g, 15f and 15g, and 31f and 31g.

In the view of FIG. 1 the surfaces 20b and 20a of member 20 and the surfaces 32a and 32b of member 32 can be seen. The surfaces 22a of member 22, 12a of member 12, 40a of member 40, 42a of member 42, 14a of member 14, and 30a of member 30 can also be seen.

Member 20 is rotatably hinged or attached at its end 20d to an end 12c of the member 12 by screw 50. Member 20 is also rotatably hinged or attached at its other end 20c to an end 22c of the member 22 by screw 51. Member 22 is rotatably hinged or attached at its end 22d to an end 40d of the member 40 by a screw 52. Member 40 is rotatably hinged or attached at its center to the center member 12 by screw 53. Member 12 is rotatably hinged or attached at its end 12d to an end 42c of the member 42 by a screw 54. Member 40 is rotatably hinged or attached at its end 40c to an end 14c of the member 14 by a screw 55. Member 14 is rotatably hinged or attached at its center to the center of member 42 by a screw 56. Member 14 is rotatably hinged or attached at its end 14d to end 32d of member 32 by a screw 59. Member 32 is rotatably hinged or attached at its end 32c to end 30b of member 30. Member 30 is rotatably hinged or attached at its end 30c to and end 42d of member 42.

FIG. 1 shows the plurality of bumpers 13a–13l attached to the first elongated member 12 and the plurality of bumpers 15a–15l attached to the second elongated member 14. As clearly shown, some of the bumpers are located between and at positions distinct from various sections or points of attachment 53, 54, 55, and 56, respectively, of the first and second members 12 and 14.

Figure 2:
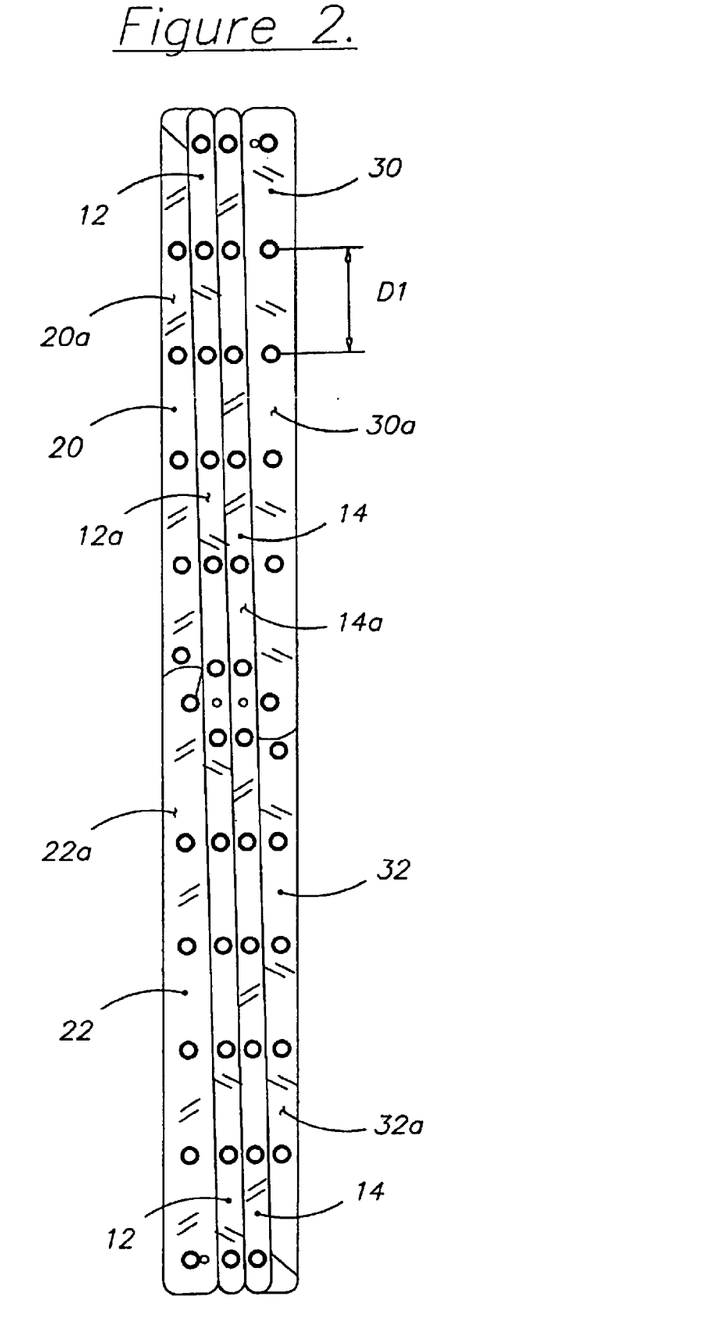
FIG. 2 shows a top planar view of an apparatus for use in accordance with a first embodiment of the present invention with the apparatus in a closed or fully contracted state.

FIG. 2 shows a top planar view of the apparatus 10 for use in accordance with a first embodiment of the present invention with the apparatus 10 in a closed or contracted state. The surfaces 20a of member 20, 12a of member 12, 14a of member 14, and 30a of member 30 can be seen. The surfaces 20b of member 20, 40a of member 40, 42a of member 42, and 32b of member 32 are covered by one or more of the surfaces shown in FIG. 2.

Figure 3:
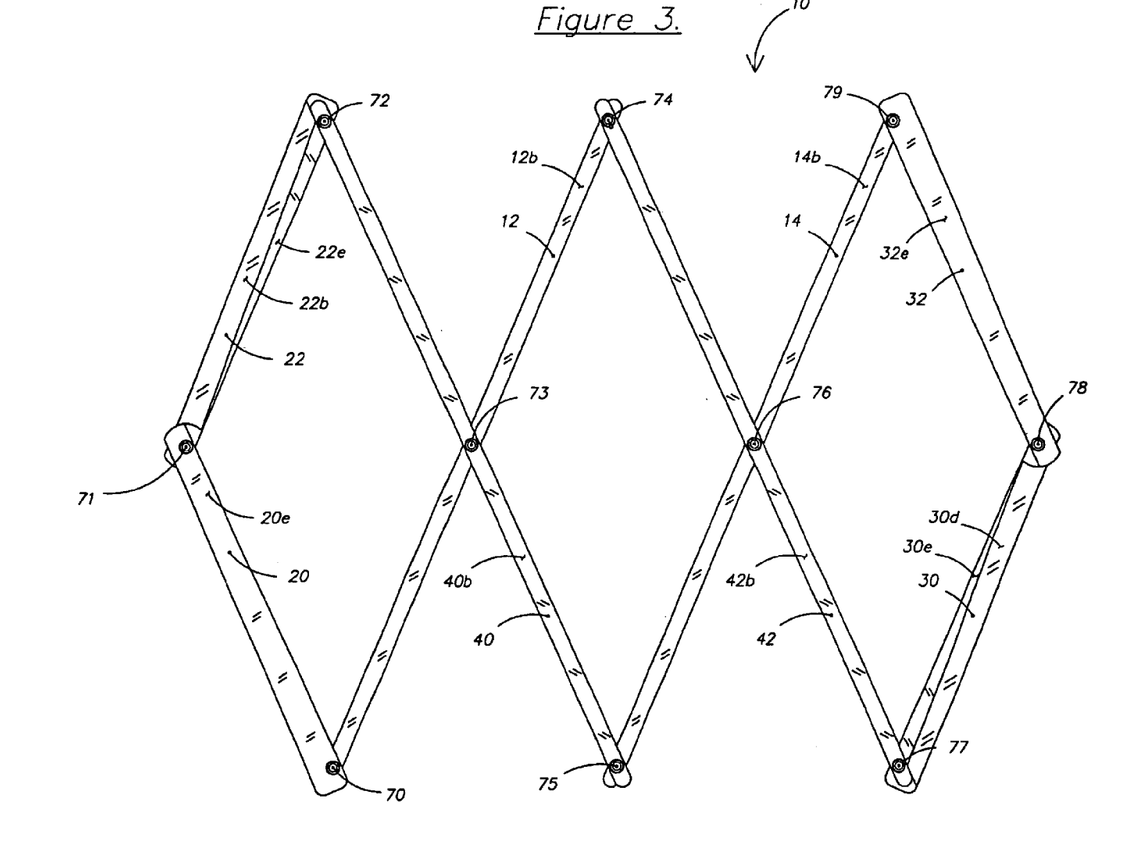
FIG. 3 shows a bottom planar view of an apparatus for use in accordance with a first embodiment of the present invention with the apparatus in a fully expanded state.

FIG. 3 shows a bottom planar view of an apparatus 10 for use In accordance with a first embodiment of the present invention with the apparatus in an expanded state. FIG. 3 shows legs 70, 71, 72, 73, 74, 75, 76, 77, 78, and 79. Each leg is attached and made part of the apparatus by a screw as shown in FIG. 1. Legs 70, 71, 72, 73, 74, 75, 76, 77, 78, and 79 are attached to screws 50, 51, 52, 53, 54, 55 56, 57, 58, and 59, respectively. The apparatus 10 is typically used so that the legs 70–79 sit on and come in contact with a floor or a table, for example, while a piece of glass (or some other plate like object) is laid on top of a plurality of the bumpers 21a–e, 23a–f, 13a–l, 15a–l, 31a–f, and 33a–e in FIG. 1.

FIG. 3 shows surface 20e of member 20, surface 22b and 22e of member 22, surface 40b of member 40, surface 12b of member 12, surface 14b of member 14, surface 42b of member 42, surface 32e of member 32, and surfaces 30d and 30e of member 30.

Figure 4:
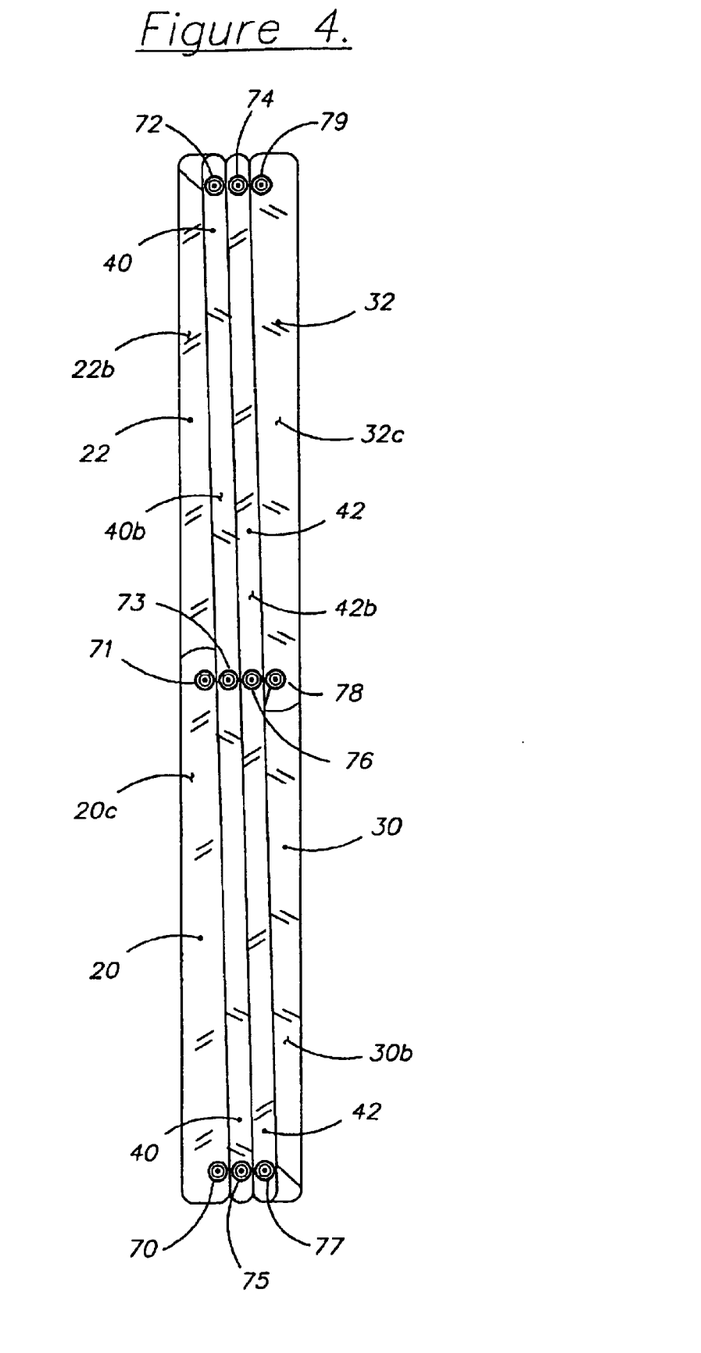
FIG. 4 shows a bottom planar view of an apparatus for use in accordance with a first embodiment of the present invention with the apparatus in a closed or fully contracted state.

FIG. 4 shows a bottom planar view of the apparatus 10 for use in accordance with a first embodiment of the present invention with the apparatus 10 in a closed or contracted state. The surfaces 22b of member 22, 20c of member 20, 40b of member 40, 42b of member 42, 32c of member 32, and 30b of member 30 can be seen in FIG. 4. The surfaces 22e of member 22, 12b of member 12, 14b of member 14, and 30e of member 30 in FIG. 3, have been covered over by one or more members in FIG. 4.

Figure 5:
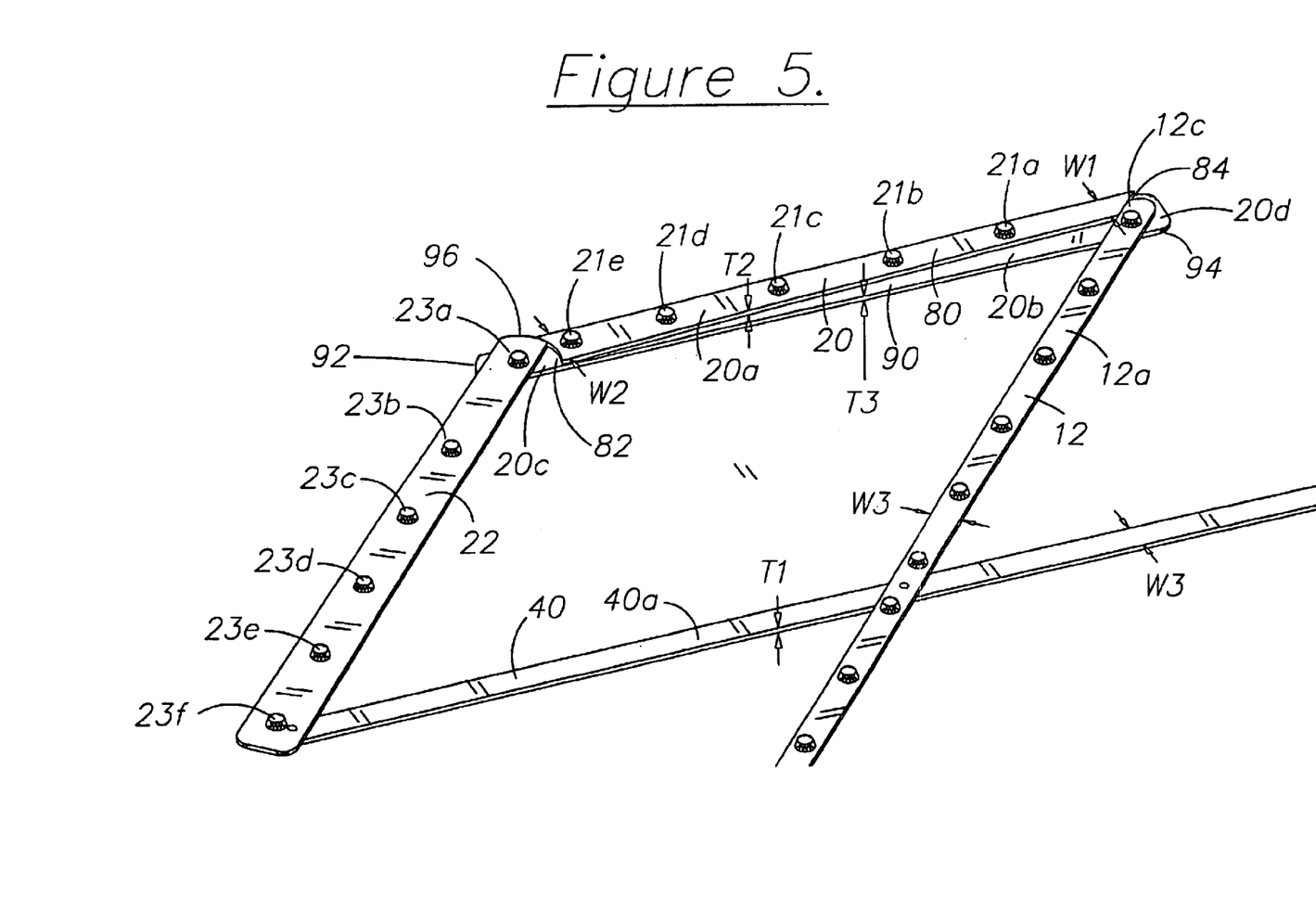
FIG. 5 shows a perspective view of portions of the apparatus of FIG. 1.

FIG. 5 shows a perspective view of member 20. Members 20, 22, 30 and 32 shown in FIG. 1 may be constructed in the same way or nearly the same. The structure of member 20 will be described and this description can be applied, with changes in numbering to members 22, 30 and 32. Member 20 is comprised of two members 80 and 90 which are integrated together. Member 80 starts from a width of W1, shown in FIG. 5, which may be 0.75 inches near end 20d of member 20 and broadens in a linear manner to a width of W2, which may be 1.5 inches, near end 20c of member 20. Members, 40, 42, 12, and 14 each may have a width of W3, shown in FIG. 5, which may be 0.75 inches and a thickness of T1 which may be 0.125 inches.

Member 80 has a thickness of T2 shown in FIG. 5, which may be 0.125 inches. Member 90 has a thickness of T3 which may be 0.125 inches. The member 80 can be thought of as lying on top of and partially covering member 90 so that part of member 20 has a thickness of T2+T3, while part of the member 20 has a thickness of T3. Member 80 has a straight edge 84 near end 20d of the member 20. The straight edge 84 is at an angle, and abuts straight edge 12c of the member 12 when the apparatus is expanded or opened to its maximum and thus prevents the apparatus 10 from opening any further than in FIG. 1. A similar straight edge for member 22 at end 22d abuts a straight edge of member 40 at end 40d, a straight edge for member 30 at end 30c abuts member 42 at end 42d, and a straight edge for member 32 at end 32d abuts member 14 at end 14d.

Member 80 also has an curved edge 82 near end 20c of member 20. The curved edge 82 of member 20 in conjunction with the curved edge 96 of adjacent member 22 allows the members 20 and 22 to rotate freely about the screw 51 that joins members 20 and 22. Similarly, members 30 and 32 can rotate freely about screw 58 because of a curved member 97 for member 30 and curved member 98 for member 32.

The member 90 has a curved portion 92 at end 20c and has a less curved portion 94 at end 20d of member 20. The structure of member 20 shown in FIG. 5, and the similar or same structure of members 22, 30 and 32 of FIG. 1 allows easy expansion and contraction of the apparatus 10 from its maximum opening size in FIG. 1 to its maximum closing size shown in FIG. 2. The thickness T1 of the member 40 (and members 12, 14, and 42 which may be of the same structure disregarding bumper attachments and placement in the apparatus 10), may be 0.125 inches. The width W3 of member 40 (or members 12, 14, and 42) may be 0.75 inches.

Figure 6:
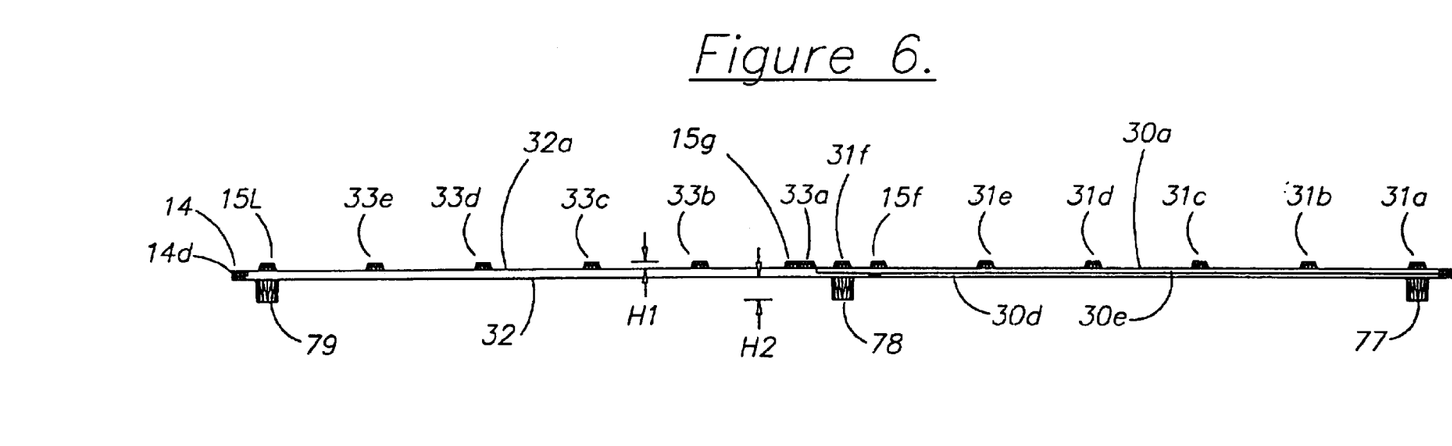
FIG. 6 shows a side view of the apparatus of FIG. 1.

FIG. 6 shows a side view of the apparatus 10 of FIG. 1. The sides of members 32 and 30 can be seen in FIG. 6. The end 14d of member 14 can be seen in FIG. 6. FIG. 6 also shows bumpers 33a–e attached to side 32a of member 32 and bumpers 31a–g attached to side 30a of member 30. Each bumper of bumpers 33a–e and 31a–g is shown as the same size, and has a height of H1 (shown for 33b) which may be 0.1875 inches. FIG. 6 also shows leg 79 attached to member 32, leg 78 attached to members 32 and 30, and leg 77 attached to member 30. Each leg of 77–79 may be of the same size and may have a height of H2 (shown for 78) which may be 0.625 inches. Each leg may be attached at a pivot, rotation or connection point joining two members.

Figure 7:
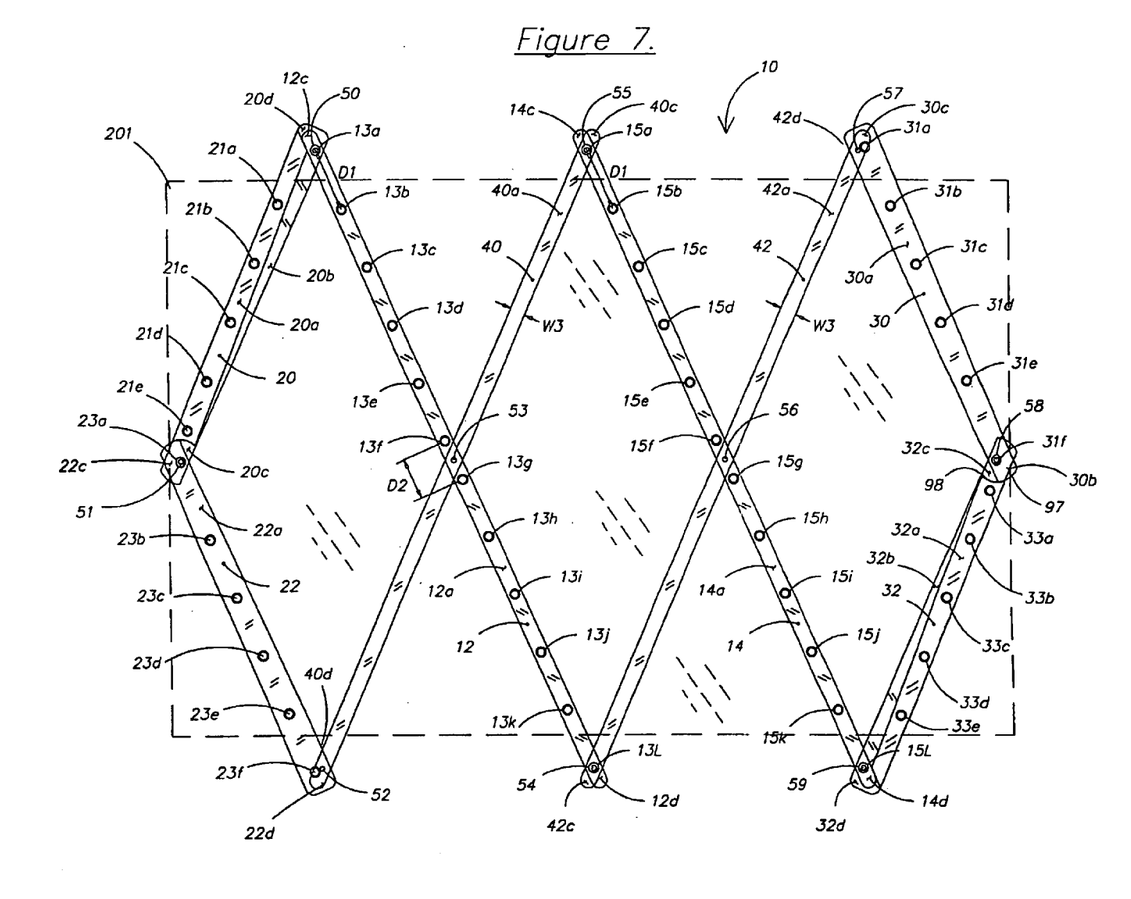
FIG. 7 shows a top planar view of a sheet of glass on the apparatus of FIG. 1.

In operation, as shown in FIG. 7, a sheet or plate of glass 201 (shown in dashed lines) may be laid on top of the apparatus 10. The apparatus 10 may be placed in the completely expanded state of FIG. 1, may be placed in the completely contracted state of FIG. 2, or may be placed in any state or position in between prior to laying glass on top of apparatus 10. In this manner different sizes of glass can be accommodated. The sheet of glass 201 is frictionally held by the apparatus 10 by the bumpers 21a–e, 23a–f, 13a–13L, 15a–14L, 31a–31f, and 33a–33e.

Figure 8:
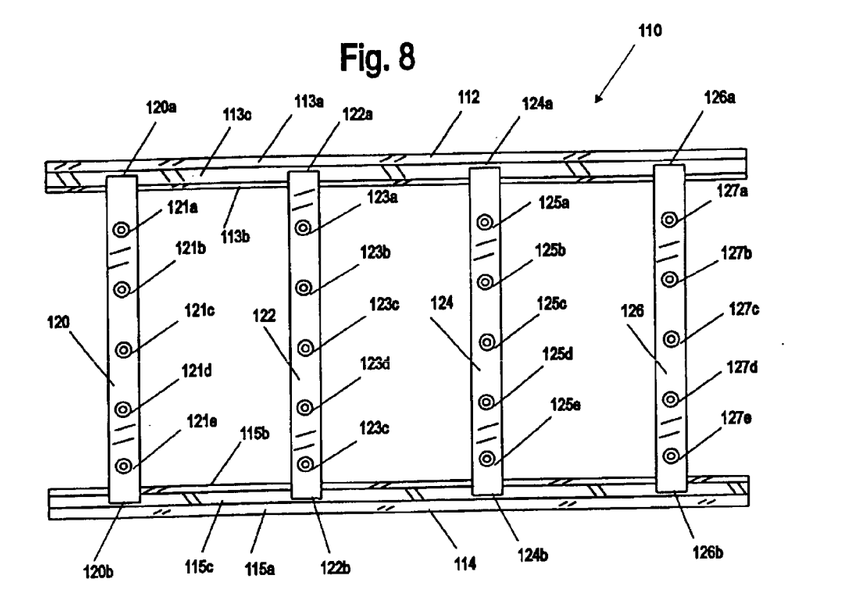
FIG. 8 shows a top planar view of a second embodiment in accordance with the present invention.

FIG. 8 shows a top planar view of a second embodiment in accordance with the present invention. FIG. 8 shows apparatus 110 which is comprised of rails 112 and 114, and members 120, 122, 124, and 126.

Rail 112 includes wall portions 113a and 113b. Rail 112 includes channel 113c and bottom portion 113d. Similarly rail 114 includes wall portions 115a and 115b. Rail 114 includes channel 115c and bottom portion 115d.

Member 120 includes bumpers 121a, 121b, 121c, 121d, and 121e. Member 120 also includes protruding portion 120a and protruding portion 120b. Similarly members 122, 124, and 126 includes bumpers 123a–e, bumpers 125a–e, and bumpers 127a–e, respectively, and protruding portions 122a–b, 124a–b, and 126a–b, respectively.

Figure 9A:
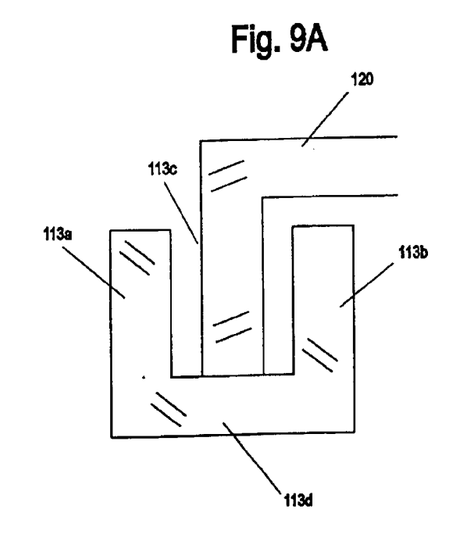
FIG. 9A shows a cross sectional view of portions of the second embodiment of FIG. 8 including a cross section of a first rail.
Figure 9B:
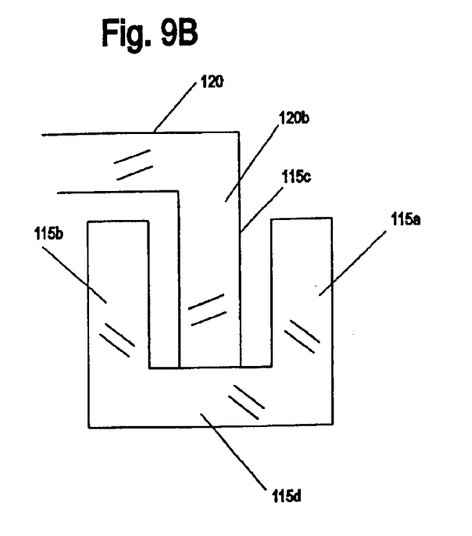
FIG. 9B shows a cross sectional view of portions of the second embodiment of FIG. 8 including a cross section of a second rail.

FIG. 9A shows a cross sectional view of portions of the second embodiment of FIG. 8 including a cross section of the rail 112 and a cross section of protrusion portion 120a of the member 120. FIG. 9B shows a cross sectional view of portions of the second embodiment of FIG. 8 including a cross section of the rail 114 and a cross section of protrusion portion. 120b of the member 120.

Figure 10:
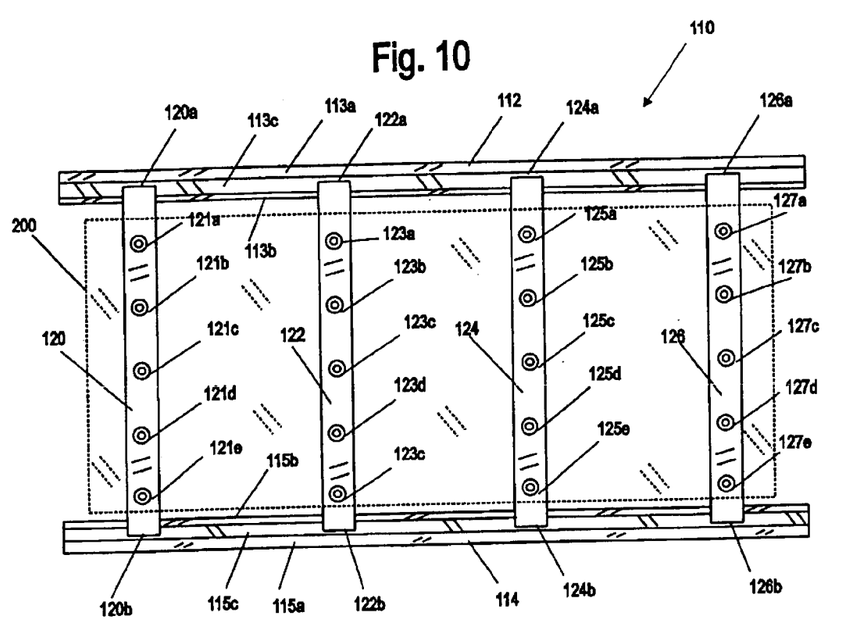
FIG. 10 shows a top planar view of a sheet of glass on the apparatus of FIG. 8.

In operation, for the second embodiment of FIGS. 8, 9A, and 9B, the members 120, 122, 124, and 126 can be slid and thus moved along the rails 112 and 114 into the desired position, for example the position shown in FIG. 8. A plate or sheet of glass 200, may then be laid on top of the apparatus 110 as shown in FIG. 10, so that it covers, for example, members 120, 122, 124, and 126. The sheet of glass will be frictionally held by the bumpers 121a–e, 123a–e, 125a–e, and 127a–e, which engage the underside of the glass. The glass may then be washed or cut.

The bumpers, such as bumpers 21a–e, in FIG. 1, may be made of rubber or some other soft substance which would apply friction to glass without scratching glass. The bumpers may have an initial diameter D1 of 0.5 inches which may taper to a final diameter D2, of 0.375 inches as shown in FIG. 1 for bumper 31c. The legs, such as legs 70–79 in FIG. 1 may be made of the same material as the bumpers 21a–e, such as rubber or some other soft substance that would apply friction to, for example, a table top. Each leg may have an outer diameter of D3 as shown for leg 76 in FIG. 3, which may be 0.625 inches. The members, such as member 22 may be made of aluminum, plastic, metal like substances, and generally other types of rigid materials.

The members 12, 14, 40 and 42 may each be thirty-four inches long from end to end. The members 20, 22, 30, and 32 may be about half that length. The apparatus 10 and/or the apparatus 100 should be able to handle most sizes of sheets of glass from, for example, the smallest piece to approximately fifty inches wide by thirty two inches tall. The width of a sheet of glass would spread out from the junction where end 20c of member 20 and end 22c of member 22 are rotatably connected in FIG. 1, to the junction where end 30b of member 30 and end 32c of member 32 are rotatably connected in FIG. 1. The height of a sheet of glass would spread out from, for example the junction where end 40c of member 40 is rotatably connected to end 14c of member 14 to the junction where end 42c of member 42 is rotatably connected to end 12d of member 12.

Figure 11:
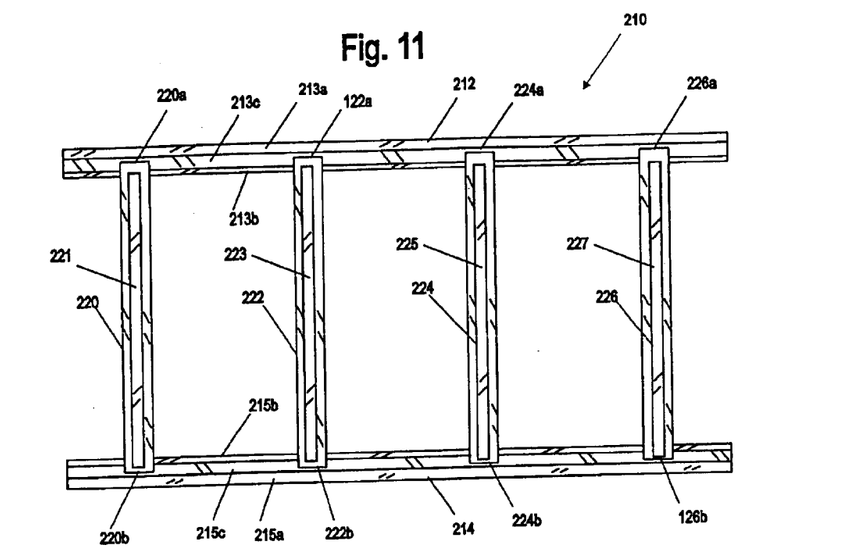
FIG. 11 shows a top planar view of another embodiment of the present invention where strips of material are used instead of bumpers.

FIG. 11 shows a top planar view of another embodiment of the present invention where strips are used instead of bumpers. FIG. 11 shows apparatus 210 which is comprised of rails 212 and 214, and members 220, 222, 224, and 226. Rail 212 includes wall portions 213a and 213b. Rail 212 includes channel 213c and a bottom portion. Similarly rail 214 includes wall portions 215a and 215b. Rail 214 includes channel 215c and a bottom portion.

Member 220 includes a strip 221. The strip 221 is an alternative to the bumpers, such as bumpers 121a–121e of FIG. 8. Members 222, 224, and 226 in FIG. 11 similarly include strips 223, 225, and 227 respectively. Members 220, 222,224, and 226 have protruding portions 220a and 220b, 222a and 222b, 224a and 224b, and 226a and 226b, respectively. Each strip of the strips 221, 223, 225, and 227 in FIG. 11 could be made of rubber. A sheet of glass, such as sheet of glass 200 in FIG. 10 can be placed on the strips 221, 223, 225, and 227 similar to the manner in which sheet 200 is placed on apparatus 110 of FIG. 8.

Strips could also be used as an alternative to bumpers with the structure of FIG. 1 with a strip replacing, for example, bumpers 21a–21e on member 20, a strip replacing bumpers 23a–23g on member 22, a strip replacing bumpers 13a–13e on part member 12, a strip replacing bumpers 13f–13L on part of member 12, a strip replacing bumpers 15a–15f on members 14, a strip replacing bumpers 15g through 15L on member 14, a strip replacing bumpers 31a–31f on member 30, and a strip replacing bumpers 33a–33e on member 32. The apparatus 10 of FIG. 1 may be mounted on one side. For example, the screws 50, 51 and, 52 and their corresponding legs 70, 71, and 72 may be mounted to a fixed surface so that the apparatus 10 can only be expanded in one direction D shown in FIG. 1.

Figure 12:
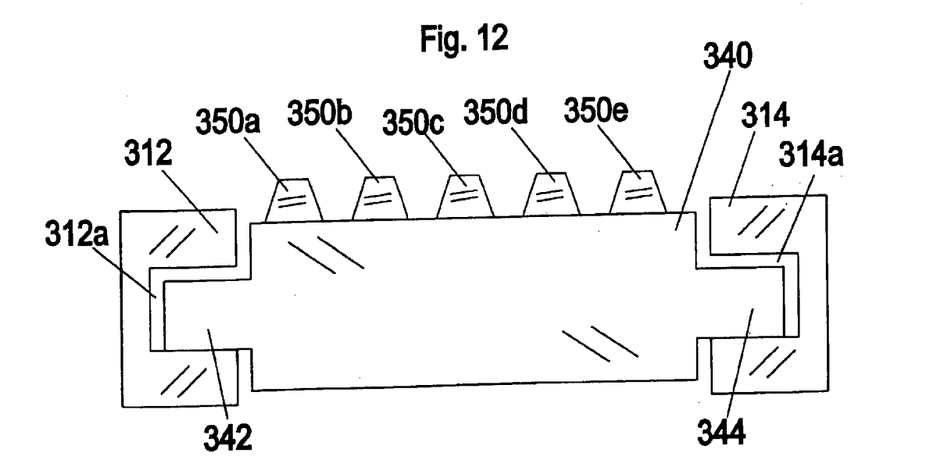
FIG. 12 shows a cross sectional view of another embodiment of the present invention where a member or members can slide along rails to provide expandability.

FIG. 12 shows an alternative embodiment where a member or members can also slide along rails to provide expandability. FIG. 12 shows a cross section of a member 340 and rails 312 and 314. The member 340 has bumpers 350a, 350b, 350c, 350d, and 350e. There may be a plurality of further members like 340 similar to the apparatus 110 of FIG. 8. The member 340 may be integrated into an apparatus like 110 of FIG. 8 or 210 of FIG. 11, except that member 340 at its similar members differ and the rails differ with regards to the connection or interaction with rails 312 and 314. As shown in FIG. 12, member 340 has extensions 342 and 344. Extension 342 fits into slot 312a of rail 312 and extension 344 fits into slot 314a of member 314.

In addition to the pivot point expandability provided by the apparatus 10 of FIG. 1 and the slidable expandability provided by the apparatus 110 of FIG. 10, an apparatus in accordance with the present invention may be expandable in any number of ways such as for example hinges.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. An apparatus for supporting a sheet of glass comprising:
    a first elongated member having a first side including a plurality of bumpers attached thereto and spaced along the length thereof;
    a second elongated member having a first side including a plurality of bumpers attached thereto and spaced along the length thereof; and
    means for attaching said first member and said second member together, said attaching means located at at least two sections of each of said first and second elongated members so that said first side of said first member and said first side of said second member lie in substantially the same plane;
    wherein at least some of said plurality of bumpers attached to said first member are located between said attaching means at positions distinct from the locations of said attaching means and said plurality of bumpers attached to said second member are located between said attaching means at positions distinct from the locations of said attaching means, each of said plurality of bumpers being adapted to contact a sheet of glass in order to hold the glass without scratching the sheet of glass.

2. The apparatus of claim 1, wherein said first and second members are connected together so that the spacing between said first and second members can be adjusted.

3. The apparatus of claim 2, wherein said first member has a first end and said second member has a first end, said first end of said first member and said first end of said second member are rotatably connected together.

4. The apparatus of claim 1 wherein said first member includes a second side which has a plurality of legs attached to said second side of said first member and said second member includes a second side which has a plurality of legs attached to said second side of said second member.

5. The apparatus of claim 1 further including a third member and a fourth member wherein said first member has a first end and a second end, said second member has a first end and a second end, and a point which is substantially at the center of each of said members, said third member has a first end and a second end, said fourth member has a first end and a second end, and a point which is substantially at the center of each of said members, said first end of said first member is rotatably connected to said first end of said second member, said second end of said first member is rotatably connected to said first end of said third member, said second end of said third member is rotatably connected to said first end of said fourth member, and the point substantially at the center of s aid second member is rotatably connected to the point substantially at the center of said fourth member.

6. The apparatus of claim 5 wherein said first member and said third member are approximately equal in size, said second member and said fourth member are approximately equal in size, and said first member is about half the size of said second member.

7. The apparatus of claim 6 wherein said first member and said third member are each comprised of a first portion and a second portion having different thicknesses and said second member and said fourth member each have a substantially uniform thickness.

8. The apparatus of claim 7 wherein said third member is rotatably connected at said second end of said third member to said fourth member and said fourth member is rotatably connected at the point substantially at the center of said fourth member to said third member at the point substantially at the center of said third member, so that said third member and said second member lie on top of said fourth member.

9. The apparatus of claim 7 wherein said first portion has a first end which is curved and a second end which is a straight edge.

10. The apparatus of claim 7 wherein said first portion has a width which gradually increases from a first end to a second end.

11. The apparatus of claim 1 further including a third member and a fourth member, said third member having a first side including a plurality of bumpers attached to said third member, said fourth member having a first side including a plurality of bumpers attached to said fourth member wherein said first, second, third and fourth members are connected together so that said first sides of each of said first, second, third, and fourth members lie in the same plane.

12. The apparatus of claim 11 wherein said fist, second, third, and fourth members each has a first end and a second end, said first member is rotatably connected at said second end of said first member to said first end of said third member, and said second member is rotatably connected at said second end of said second member to said first end of said fourth member.

13. The apparatus of claim 12 wherein said first, second, third, and fourth members are each comprised of a first portion and a second portion having different thicknesses.

14. The apparatus of claim 1 wherein each of said bumpers is made from rubber.

15. A method for supporting a sheet of glass comprising the steps of:

expanding an expandable device having a first elongated member with a first side including a plurality of bumpers attached thereto and spaced along the length thereof; a second elongated member with a first side including a plurality of bumpers attached thereto and spaced along the length thereof; and means for attaching said first member and said second member together, said attaching means located at at least two sections of each of said first and second elongated members so that said first side of said first member and said first side of said second member lie in substantially the same plane, some of said plurality of bumpers attached to said first member and some of said plurality of bumpers attached to said second member being located between said attaching means at positions distinct from the locations of said attaching means and placing a sheet of glass on said plurality of bumpers of said expandable device wherein each of said plurality of bumpers contacts the sheet of glass in order to hold the glass without scratching the sheet of glass.

16. The method of claim 15 wherein said first and second members are rotatably connected together.

17. The method of claim 15 wherein each of said bumpers is made from rubber.

* * * * *